United States Patent
Gonzalez Bautista et al.

(10) Patent No.: US 12,145,627 B2
(45) Date of Patent: Nov. 19, 2024

(54) SYSTEM AND METHOD FOR PREDICTING THE TRAJECTORY OF A VEHICLE

(71) Applicant: RENAULT S.A.S., Boulogne-Billancourt (FR)

(72) Inventors: David Gonzalez Bautista, Saint Cyr l'ecole (FR); Vicente Milanes, Boulogne-Billancourt (FR); Francisco Martin Navas Matos, Paris (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 235 days.

(21) Appl. No.: 17/784,531

(22) PCT Filed: Dec. 10, 2020

(86) PCT No.: PCT/EP2020/085633
§ 371 (c)(1),
(2) Date: Jun. 10, 2022

(87) PCT Pub. No.: WO2021/116345
PCT Pub. Date: Jun. 17, 2021

(65) Prior Publication Data
US 2023/0015485 A1    Jan. 19, 2023

(30) Foreign Application Priority Data
Dec. 13, 2019  (FR) ........................................ 1914342

(51) Int. Cl.
*B60W 60/00* (2020.01)
*B60W 30/18* (2012.01)
*B60W 40/105* (2012.01)

(52) U.S. Cl.
CPC .. *B60W 60/0027* (2020.02); *B60W 30/18163* (2013.01); *B60W 40/105* (2013.01);
(Continued)

(58) Field of Classification Search
None
See application file for complete search history.

(56) References Cited

U.S. PATENT DOCUMENTS

2018/0037233 A1*  2/2018  Fendt ..................... G08G 1/167

FOREIGN PATENT DOCUMENTS

WO   WO-2019204053 A1 *  10/2019  ............ B60W 30/09

OTHER PUBLICATIONS

Kazemi Hadi et al. "A Learning-Based Stochastic MPC Design for Cooperative Adaptive Cruise Control to Handle Interfering Vehicles", IEEE Transactions on Intelligent Vehicles, vol. 3, No. 3, Sep. 1, 2018, pp. 266-275, XP011689289.
(Continued)

*Primary Examiner* — Christian Chace
*Assistant Examiner* — Katherine Marie Fitzharris
(74) *Attorney, Agent, or Firm* — Oblon, McClelland, Maier & Neustadt, L.L.P.

(57) ABSTRACT

A method predicts the trajectory of an ego vehicle travelling in a main lane. A lane change by the ego vehicle from the main lane to an adjacent lane is determined according to an estimate of the dynamic behavior of a group of vehicles travelling in the adjacent lane. The group of vehicles includes at least one main vehicle which is located near the ego vehicle and a secondary vehicle which is located behind the ego vehicle.

7 Claims, 2 Drawing Sheets

(52) U.S. Cl.
CPC ............... *B60W 2554/4041* (2020.02); *B60W 2554/4046* (2020.02)

(56) References Cited

OTHER PUBLICATIONS

Moradi-Pari Ehsan et al. "Utilizing Model-Based Communication and Control for Cooperative Automated Vehicle Applications", IEEE Transactions on Intelligent Vehicles, vol. 2, No. 1, Mar. 1, 2017, pp. 38-51, XP011655238.

* cited by examiner

[Fig. 1]
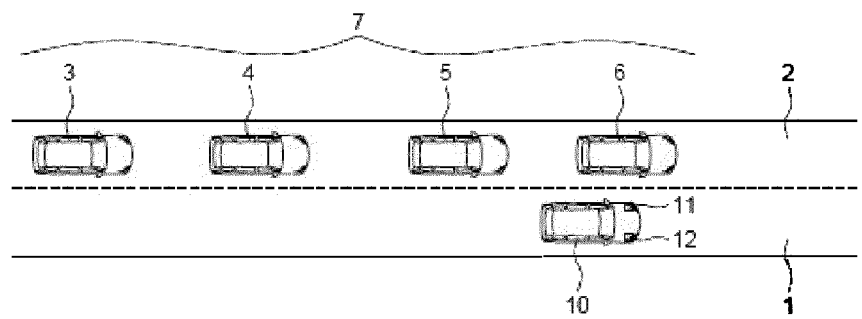
[Fig. 2]
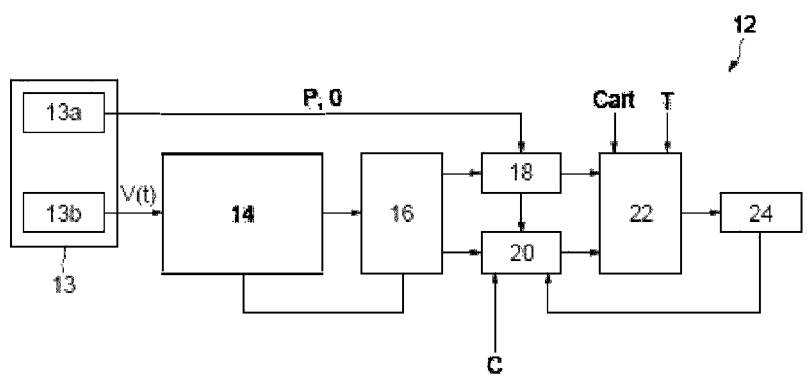

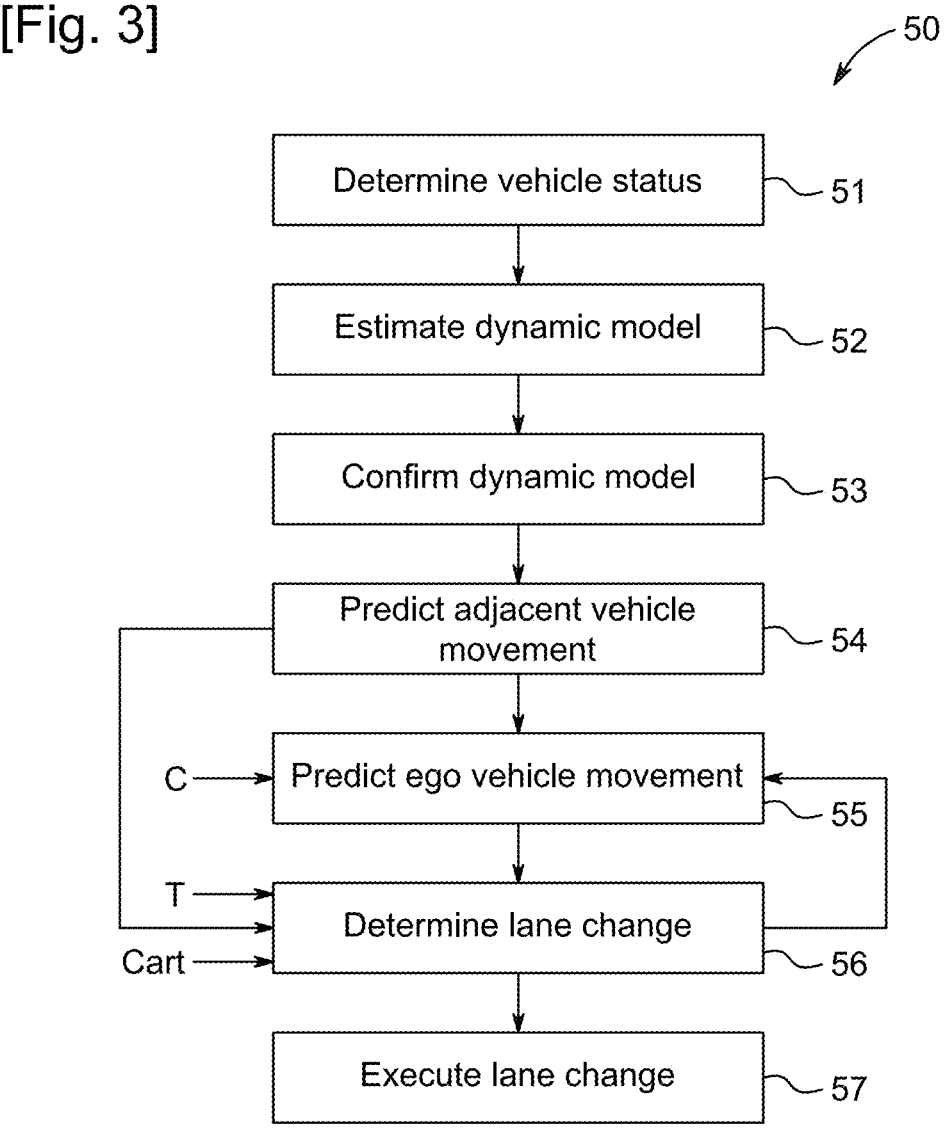
[Fig. 3]

SYSTEM AND METHOD FOR PREDICTING THE TRAJECTORY OF A VEHICLE

BACKGROUND

The present invention relates to the field of devices and methods for predicting a path and/or a trajectory of a motor vehicle, and computer programs intended to implement such methods.

More specifically, the present invention relates to the field of driver assistance for a motor vehicle, and in particular for assisting the driver for activating or not activating the driver assistance systems.

Motor vehicles are currently equipped with increasingly efficient Advanced Driver Assistance Systems (ADAS). The purpose of an advanced driver assistance system is to allow a motor vehicle to be autonomously driven, i.e., without any intervention from the driver, or by sharing the driving with the driver of the vehicle in order to keep the vehicle in its traffic lane and/or to reduce its speed. In particular, an advanced driver assistance system can be used to anticipate a path and/or a trajectory of a motor vehicle. In the present application, the path of a vehicle will be considered to be a geometric form corresponding to the progress of the vehicle between a departure point and an arrival point. The trajectory of a vehicle will be considered to be the temporal evolution of the position of the vehicle between the departure point and the arrival point.

Vehicles referred to as "autonomous" vehicles or partially assisted driving vehicles require an ample model of the environment of the vehicle in order to allow an algorithm to make decisions. This is enabled by virtue of various proprioceptive sensors, such as an accelerometer, a gyrometer, etc., and exteroceptive sensors, such as cameras, radar, LIDAR, ultrasonic sensors, etc., as well as data fusion methods configured to process the received information and to compute the status (position, speed, acceleration, yaw, etc.) of the vehicle and of the surrounding objects.

In such vehicles, it is thus essential that the movements of the ego vehicle, as well as of other moving objects that are present in the immediate environment of said vehicle and that are likely to become obstacles when the trajectory of the ego vehicle interferes with the trajectory of an object, are predicted.

Lane Keeping Assist (LKA) systems are known, for example, that allow the vehicle to be automatically repositioned in its lane or even Lane Change Assist (LCA) systems are known that allow the vehicle to change lane.

Other examples of driver assistance are known, such as Automatic Emergency Steering (AES) assistance systems that are capable of detecting any obstacles and of performing emergency steering, predicting the trajectories of the moving objects allows the potential collision risk to be analyzed, or even Adaptive Cruise Control (ACC) assistance systems are known that are capable of controlling the speed and of automatically keeping a safe distance relative to the vehicle in front.

A method is known from document EP 3056405-A1 for controlling the lane change by an ego vehicle according to a first distance between two vehicles adjacent to the ego vehicle as a target for the lane change by said ego vehicle.

The main shortcoming of these driver assistance systems lies in a lack of fluidity in their response reaction. Indeed, it is particularly difficult to predict the behavior of the vehicles located in the lanes adjacent to the ego vehicle, such that the decision-making time of these assistance systems is particularly long.

Therefore, a requirement exists for optimizing the lane change by an ego vehicle from a main lane to an adjacent lane.

BRIEF SUMMARY

In light of the above, the aim of the invention is to allow a trajectory of a motor vehicle to be predicted whilst overcoming the aforementioned disadvantages.

The aim of the present invention is a method for predicting the trajectory of an ego vehicle travelling in a main lane, wherein a lane change by the ego vehicle from the main lane to an adjacent lane is determined according to an estimate of the dynamic behavior of a group of vehicles travelling in the adjacent lane. Said group of vehicles comprises at least one main vehicle located near the ego vehicle and a secondary vehicle located behind said ego vehicle.

Thus, the movement of the traffic corresponding to the dynamic behavior of the vehicles in the lane adjacent to the lane of the ego vehicle is predicted in order to make a lane change decision.

The prediction of the trajectory of the ego vehicle is determined according to the behavior of a group of vehicles present in the lane adjacent to the traffic lane of the ego vehicle.

Advantageously, position, orientation and speed information of the ego vehicle and of the vehicles of the group of vehicles is gathered and a dynamic model per pair of consecutive vehicles travelling in the adjacent lane is established according to the gathered information. This allows a precise dynamic model to be acquired for each of the adjacent vehicles according to the data of the vehicles nearby in the same traffic lane.

The dynamic model per pair of consecutive vehicles is acquired by determining a second-order transfer function corresponding to the behavior of the ego vehicle relative to the pair of considered consecutive vehicles using an autoregressive exogenous (ARX) computation model to acquire the dynamic data of a pair of consecutive vehicles. The behavior of the ego vehicle depends on its longitudinal model and on its longitudinal controller.

The position, the orientation and the speed of the vehicles are particularly obtained by the various proprioceptive and exteroceptive sensors of a perception system of the ego vehicle.

For example, the established dynamic models are confirmed by comparing an error of the autoregressive exogenous computation model with a threshold value dependent on the actual speed of each vehicle at an instant and on the speed of said vehicle at a previous instant.

According to a subsequent step, the movement of the adjacent vehicles is predicted according to the confirmed dynamic model and the initial position of said vehicles, the movement of the ego vehicle is predicted according to the prediction of the movement of the adjacent vehicles and information originating from proprioceptive sensors of the ego vehicle and the lane change by the ego vehicle is determined according to said predictions of the movement of the vehicle and of the adjacent vehicles, an overall trajectory of the ego vehicle and, for example, information originating from a map of the road on which the ego vehicle is travelling.

The step of determining the lane change by the ego vehicle allows a suitable time window to be assessed that allows the ego vehicle to safely change lane.

The lane change instruction for the ego vehicle is then sent to a module for executing the lane change by the ego vehicle.

In the event that there is no possibility for the ego vehicle to change lane, the ego vehicle is notified of the requirement to modify its parameters, such as its speed in particular.

Advantageously, the steps of the method are repeated until a lane change possibility is found.

According to a second aspect, the invention relates to a system for predicting the trajectory of an ego vehicle travelling in a main lane configured to determine a lane change by the ego vehicle from the main lane to an adjacent lane according to an estimate of the dynamic behavior of a group of vehicles travelling in the adjacent lane, said group of vehicles comprising at least one main vehicle located near the ego vehicle and a secondary vehicle located behind said ego vehicle.

Advantageously, the system comprises:
- a module for gathering or recovering position, orientation and speed information of the ego vehicle and of the vehicles of the group of vehicles;
- a module for estimating a dynamic model per pair of consecutive vehicles travelling in the adjacent lane according to the gathered information. This allows a precise dynamic model to be obtained for each of the adjacent vehicles according to the data of the vehicles nearby in the same traffic lane.

The dynamic model per pair of consecutive vehicles is acquired, for example, by determining a second-order transfer function corresponding to the behavior of the ego vehicle compared with the pair of considered consecutive vehicles using an autoregressive exogenous (ARX) computation model to acquire the dynamic data of a pair of consecutive vehicles. The behavior of the ego vehicle depends on its longitudinal model and on its longitudinal controller.

The position, the orientation and the speed of the vehicles are particularly acquired by the various proprioceptive and exteroceptive sensors of a perception system of the ego vehicle.

Advantageously, the system comprises:
- a module for confirming the established dynamic models by comparing an error of the autoregressive exogenous computation model with a threshold value dependent on the actual speed of each vehicle at an instant and on the speed of said ego vehicle at a previous instant;
- a module for predicting the movement of the adjacent vehicles according to the confirmed dynamic model and the initial position of said vehicles;
- a module for predicting the movement of the ego vehicle according to the prediction of the movement of the adjacent vehicles and information originating from proprioceptive sensors of the ego vehicle; and
- a module for determining the lane change by the ego vehicle according to said predictions of the movement of the ego vehicle and of the adjacent vehicles, an overall trajectory of the ego vehicle and, for example, information originating from a map of the road on which the ego vehicle is travelling.

According to another aspect, the invention relates to an ego motor vehicle comprising a system for perceiving and a system for predicting the trajectory of the ego vehicle as previously described.

Further aims, features and advantages of the invention will become apparent from reading the following description, which is provided solely by way of a non-limiting example and is made with reference to the accompanying drawings, in which:

BRIEF DESCRIPTION OF THE DRAWINGS

FIG. 1 is a schematic view of two adjacent lanes, in which an ego motor vehicle and a plurality of adjacent vehicles are travelling, the ego vehicle comprising a trajectory prediction system according to an embodiment of the invention;

FIG. 2 schematically shows the system for predicting the trajectory of an ego vehicle according to an embodiment of FIG. 1; and FIG. 3 shows a flowchart of a method for predicting the trajectory of an ego vehicle according to an embodiment of the invention implemented by the system of FIG. 1.

DETAILED DESCRIPTION

FIG. 1 highly schematically shows two adjacent traffic lanes 1, 2, in which motor vehicles are travelling in the same direction of travel.

As shown, an ego motor vehicle 10 is travelling in the first traffic lane 1 and four vehicles 3, 4, 5, 6 are travelling in the adjacent lane 2 adjacent to the first lane.

The vehicles 3, 4, 5, 6 form a group 7 of vehicles travelling in the adjacent lane 2 adjacent to the traffic lane 1 of the ego vehicle 10.

The ego motor vehicle 10 comprises a system 11 for perceiving the environment of said vehicle that is configured to detect the group 7 of vehicles travelling in the adjacent lane 2.

In general, the group 7 of vehicles travelling in the adjacent lane 2 comprises at least one main vehicle located in the immediate vicinity of the ego vehicle 10 and at least one secondary vehicle located behind the ego vehicle 10.

The perception system 11 allows the main vehicle 6 to be detected that is located in the adjacent lane 2 in the immediate vicinity of the ego vehicle 10.

The perception system 11 comprises various proprioceptive sensors, such as an accelerometer, a gyrometer, etc., and exteroceptive sensors, such as cameras, radar, LIDAR, ultrasonic sensors, etc., as well as data fusion methods configured to process the received information and to compute the status (position, speed, acceleration, yaw, etc.) of the ego vehicle 10 and of the surrounding objects 7.

Detecting the behavior of a vehicle of the main vehicle 6 allows a prediction to be determined of the positions of the secondary vehicles 3, 4, 5 located behind the main vehicle 6, in the direction of travel of the vehicles.

The speed oscillation of the main vehicle is propagated to the secondary vehicles, such that the greater the number of secondary vehicles, the greater the ability to predict a time window for the lane change by the ego vehicle 10.

The prediction allows a time window for the change by the ego vehicle 10 to be created according to all the vehicles travelling in the lane adjacent to the ego vehicle 10.

The ego vehicle comprises a system 12 for predicting the trajectory of said ego vehicle that is configured to send a lane change instruction for the ego vehicle according to an estimate of the behavior of the vehicles travelling in the adjacent lane 2.

As shown in detail in FIG. 2, the system 12 for predicting the trajectory of the ego vehicle 10 comprises a module 13 for determining the status of the vehicles 3, 4, 5, 6 travelling in the adjacent lane 2 adjacent to the ego vehicle 10.

To this end, the module 13 comprises a module 13a for determining the position P and the orientation O of the vehicles 3, 4, 5, 6 travelling in the adjacent lane 2 adjacent to the ego vehicle 10, and a module 13b for determining the speed V of the vehicles 3, 4, 5, 6 travelling in the adjacent lane 2 adjacent to the ego vehicle 10. The position P, the orientation O and the speed V of the adjacent vehicles are particularly obtained by the various proprioceptive and exteroceptive sensors of the perception system 11 of the ego vehicle 10.

The system 12 for predicting the trajectory of the ego vehicle 10 further comprises a module 14 for estimating a dynamic model of the vehicles travelling in the adjacent lane 2. The module 14 is configured to establish a dynamic model per pair of consecutive vehicles travelling in the adjacent lane 2. This allows a precise dynamic model to be acquired for each of the adjacent vehicles according to the data of the vehicles nearby in the same traffic lane.

The module 14 for estimating a dynamic model of the vehicles is configured to determine a second-order transfer function corresponding to the behavior of a vehicle relative to the adjacent vehicles. The behavior of the ego vehicle depends on its longitudinal model and on its longitudinal controller.

The model 14 uses an autoregressive exogenous (ARX) computation model to acquire the dynamic data of a pair of consecutive vehicles.

The autoregressive exogenous computation model is expressed according to the following equation:

$$A(z) \cdot y(t) = B(z) \cdot u(t-nk) + e(t).$$

With:
z being a time-shift;
nk being a delay;
u(t) being input data, in this case the speed of the preceding secondary vehicle;
y(t) being output data, in this case the speed of the main vehicle;
e(t) being an error value; and
A(z) and B(z) being second-order polynomials.

The polynomials A(z) and B(z) are expressed according to the following equations:

$$A(z) = 1 + a1 \cdot z^{-1} + a2 \cdot z^{-2}$$

$$B(z) = b1 + b2 \cdot z^{-1} + b3 \cdot z^{-2}.$$

The estimated dynamic models are then confirmed in a module 16 for confirming dynamic models that is configured to confirm the dynamic models according to the actual speed V(t) at an instant t and the previous speed V(t−1) at a previous instant t−1.

The system 12 for predicting the trajectory of the ego vehicle 10 further comprises a module 18 for predicting the movement of the adjacent vehicles according to the confirmed dynamic model and their initial position and a module 20 for predicting the movement of the ego vehicle 10 according to the prediction of the movement provided by the module 18 and information originating from proprioceptive sensors C of the ego vehicle 10.

The system 12 for predicting the trajectory of the ego vehicle 10 further comprises a module 22 for determining the lane change by the ego vehicle 10 according to predictions of the movement of the ego vehicle and of the adjacent vehicles and the overall trajectory T of the ego vehicle 10 and, by way of a non-limiting example, information originating from a map Cart of the road on which the ego vehicle is travelling.

The module 22 for determining the lane change by the ego vehicle 10 is configured to assess a suitable time window allowing the ego vehicle to safely change lane.

The lane change instruction for the ego vehicle 10 is sent to a module 24 for executing the lane change.

In the event that there is no possibility for the ego vehicle to change lane, the module 22 for determining a lane change can be configured to notify the module 20 for predicting the trajectory of the ego vehicle 10, particularly with a view to modifying its parameters, such as its speed in particular.

As shown in FIG. 3, the method 50 for predicting the trajectory of the ego vehicle 10 comprises a step 51 of determining the status of the vehicles 3, 4, 5, 6 travelling in the adjacent lane 2 adjacent to the ego vehicle 10.

The determination step 51 allows the position P, orientation O and speed information of the ego vehicle 10 and of the vehicles 3, 4, 5, 6 travelling in the adjacent lane 2 adjacent to the ego vehicle 10 to be gathered or recovered. The position P, the orientation O and the speed V of the adjacent vehicles are particularly acquired by the various proprioceptive and exteroceptive sensors of the perception system 11 of the ego vehicle 10.

The method 50 for predicting the trajectory of the ego vehicle 10 further comprises a step 52 of estimating a dynamic model of the vehicles travelling in the adjacent lane 2. During this step 52, a dynamic model per pair of consecutive vehicles circulating in the adjacent lane 2 is established. This allows a precise dynamic model to be acquired for each of the adjacent vehicles according to data of the vehicles nearby in the same traffic lane.

The dynamic model per pair of consecutive vehicles is acquired by determining a second-order transfer function corresponding to the behavior of a vehicle relative to the adjacent vehicles using an autoregressive exogenous (ARX) computation model to acquire the dynamic data of a pair of consecutive vehicles. The behavior of the ego vehicle depends on its longitudinal model and on its longitudinal controller. The autoregressive exogenous computation model is explained with reference to equations Math1 to Math3 above.

The estimated dynamic models are then confirmed in a step 53 of confirming dynamic models that is configured to confirm the dynamic models according to the actual speed V(t) of the vehicles at an instant t and the previous speed V(t−1) of the vehicles at a previous instant t−1. For example, in order to confirm a dynamic model, the error of the ARX computation model is compared with a threshold value. If the error is below said threshold value, the dynamic model is confirmed.

The method 50 for predicting the trajectory of the ego vehicle 10 further comprises a step 54 of predicting the movement of the adjacent vehicles according to the dynamic model confirmed in step 53 and their initial position.

The method 50 for predicting the trajectory of the ego vehicle 10 further comprises a step 55 of predicting the movement of the ego vehicle 10 according to the prediction of the movement provided in step 53 and information originating from proprioceptive sensors C of the ego vehicle 10.

In step 56, the lane change by the ego vehicle 10 is subsequently determined according to the predictions of the movement of the ego vehicle and of the adjacent vehicles and the overall trajectory T of the ego vehicle 10 and information originating from a map Cart of the road on which the ego vehicle is travelling.

The step 56 of determining the lane change by the ego vehicle 10 allows a suitable time window to be assessed allowing the ego vehicle to safely change lane.

The lane change instruction for the ego vehicle 10 is sent, in step 57, to a module 24 for executing the lane change by the ego vehicle 10.

In the event that there is no possibility for the ego vehicle to change lane, the ego vehicle 10 is notified of the requirement to modify its parameters, such as its speed in particular.

The method 50 for predicting the trajectory of an ego vehicle is repeated until a lane change possibility is found.

By virtue of the invention, the movement of traffic in a lane adjacent to the traffic lane of the ego vehicle is reliably predicted in real time and allows a position of the ego vehicle to be predicted after changing from the main lane to the adjacent lane.

Furthermore, the invention allows the constraints of the road on which the ego vehicle is travelling to be taken into account.

Such a system and method for predicting the trajectory of an ego vehicle allows traffic to flow more smoothly, without endangering the safety of the ego vehicle and of the surrounding vehicles.

The invention claimed is:

1. A method for predicting a trajectory of an ego vehicle travelling in a main lane, the method comprising:
    determining a lane change by the ego vehicle from the main lane to an adjacent lane according to an estimate of the dynamic behavior of a group of vehicles travelling in the adjacent lane, said group of vehicles comprising at least one main vehicle located near the ego vehicle and a secondary vehicle located behind said ego vehicle;
    gathering position, orientation, and speed information of the ego vehicle and of the vehicles of the group of vehicles; and
    establishing a dynamic model per pair of consecutive vehicles travelling in the adjacent lane according to the gathered information,
    wherein the dynamic model per pair of consecutive vehicles is acquired by determining a second-order transfer function corresponding to the behavior of the ego vehicle relative to each pair of considered consecutive vehicles using an autoregressive exogenous computation model, with the behavior of the ego vehicle depending on its longitudinal model and on its longitudinal controller.

2. The method as claimed in claim 1, wherein the established dynamic models are confirmed by comparing an error of the autoregressive exogenous computation model with a threshold value dependent on the actual speed of each vehicle at an instant and on the speed of said vehicle at a previous instant.

3. The method as claimed in claim 2, wherein the movement of the adjacent vehicles is predicted according to the confirmed dynamic model and the initial position of said vehicles, the movement of the ego vehicle is predicted according to the prediction of the movement of the adjacent vehicles and information originating from proprioceptive sensors of the ego vehicle and the lane change by the ego vehicle is determined according to said predictions of the movement of the ego vehicle and of the adjacent vehicles and an overall trajectory of the ego vehicle.

4. The method as claimed in claim 1, further comprising:
    repeating the determining until a lane change possibility is found.

5. A system that predicts a trajectory of an ego vehicle travelling in a main lane, the system being configured to determine a lane change by the ego vehicle from the main lane to an adjacent lane according to an estimate of the dynamic behavior of a group of vehicles travelling in the adjacent lane, said group of vehicles comprising at least one main vehicle located near the ego vehicle and a secondary vehicle located behind said ego vehicle,
    wherein the system comprises:
        a module for gathering position, orientation, and speed information of the ego vehicle and of the vehicles of the group of vehicles; and
        a module for estimating a dynamic model per pair of consecutive vehicles travelling in the adjacent lane according to the gathered information, the dynamic model per pair of consecutive vehicles being acquired by determining a second-order transfer function corresponding to the behavior of the ego vehicle relative to each pair of considered consecutive vehicles using an autoregressive exogenous computation model, with the behavior of the ego vehicle depending on its longitudinal model and on its longitudinal controller.

6. The system as claimed in claim 5, comprising:
    a module for confirming the established dynamic models by comparing an error of the autoregressive exogenous computation model with a threshold value dependent on the actual speed of each vehicle at an instant and on the previous speed at a previous instant;
    a module for predicting the movement of the adjacent vehicles according to the confirmed dynamic model and the initial position of said vehicles;
    a module for predicting the movement of the ego vehicle according to the prediction of the movement of the adjacent vehicles and information originating from proprioceptive sensors of the ego vehicle; and
    a module for determining the lane change by the ego vehicle according to said predictions of the movement of the ego vehicle and of the adjacent vehicles and an overall trajectory of the ego vehicle.

7. An ego motor vehicle, comprising:
    the system as claimed in claim 5.

* * * * *